(12) United States Patent
Angst et al.

(10) Patent No.: US 9,356,830 B2
(45) Date of Patent: May 31, 2016

(54) COMMUNICATION DEVICE FOR A REDUNDANTLY OPERABLE INDUSTRIAL COMMUNICATION NETWORK AND METHOD FOR OPERATING THE COMMUNICATION DEVICE

(71) Applicant: Siemens Aktiengesellschaft, Munich (DE)

(72) Inventors: Hermann Angst, Karlsruhe (DE); Joachim Lohmeyer, Hilpoltstein (DE)

(73) Assignee: Siemens Aktiengesellschaft, Munich (DE)

( * ) Notice: Subject to any disclaimer, the term of this patent is extended or adjusted under 35 U.S.C. 154(b) by 218 days.

(21) Appl. No.: 13/775,997

(22) Filed: Feb. 25, 2013

(65) Prior Publication Data

US 2013/0223204 A1    Aug. 29, 2013

(30) Foreign Application Priority Data

Feb. 29, 2012    (EP) .................................... 12157499

(51) Int. Cl.
*G01R 31/08*    (2006.01)
*H04L 12/24*    (2006.01)
*H04L 12/40*    (2006.01)

(52) U.S. Cl.
CPC ...... *H04L 41/0668* (2013.01); *H04L 12/40006* (2013.01); *H04L 12/40176* (2013.01); *H04L 2012/4026* (2013.01)

(58) Field of Classification Search
None
See application file for complete search history.

(56) References Cited

U.S. PATENT DOCUMENTS

| 7,209,453 | B1 | 4/2007 | Yun et al. | |
| 8,582,424 | B2 | 11/2013 | Kirrmann | |
| 2009/0003320 | A1* | 1/2009 | Luo | ........................ H04L 45/00 370/352 |
| 2011/0029687 | A1 | 2/2011 | Kirrmann et al. | |
| 2011/0116508 | A1* | 5/2011 | Kirrmann | ............. H04L 12/437 370/392 |

FOREIGN PATENT DOCUMENTS

| CN | 101335690 | 12/2008 |
| CN | 101989943 | 3/2011 |
| CN | 102106121 | 6/2011 |
| DE | 10 2008 017 192 | 10/2009 |
| EP | 1 416 671 | 5/2004 |

(Continued)

OTHER PUBLICATIONS

Hans Weibel, "Tutorial on Parallel Redundancy Protocol (PRP)", Zurich University of Applied Sciences, Institute of Embedded Systems (InES), Jul. 7, 2011.*

*Primary Examiner* — Christopher Crutchfield
*Assistant Examiner* — Thinh Tran
(74) *Attorney, Agent, or Firm* — Cozen O'Connor (57) ABSTRACT

A communication device for a redundantly operable industrial communication network comprises at least one first and one second transmitting and receiving unit each having an interface for a network connection of the industrial communication network. A signal processing unit is connected to the first and second transmitting and receiving units. A singly linked network node is connected to the signal processing unit via a coupling element. The signal processing unit is connected to the coupling element via a first and second interface. In this case, the first interface is provided exclusively for communicating data packets received by the first receiving unit, while the second interface is provided exclusively for communicating data packets received by the second receiving unit.

21 Claims, 6 Drawing Sheets

(56) References Cited

FOREIGN PATENT DOCUMENTS

| | | |
|---|---|---|
| EP | 2015501 A1 * | 1/2009 |
| EP | 2 204 952 | 7/2010 |
| EP | 2 282 452 | 2/2011 |
| EP | 2 343 857 | 7/2011 |
| EP | 2 413 538 | 2/2012 |

* cited by examiner

COMMUNICATION DEVICE FOR A REDUNDANTLY OPERABLE INDUSTRIAL COMMUNICATION NETWORK AND METHOD FOR OPERATING THE COMMUNICATION DEVICE

BACKGROUND OF THE INVENTION

1. Field of the Invention

The present invention relates to a communication device and method for operating the communication device in a redundant industrial communication network.

2. Description of the Related Art

In distributed industrial automation systems, when registering, evaluating and communicating measurement and control data, it is necessary to ensure that complete and unchanged data are present in real time particularly in the case of time-critical industrial production processes. Intentional changes, unintentional changes or changes caused by a technical fault are to be avoided because within an industrial automation system, this can lead to inconsistent system states and system failures with economically serious outage times.

In addition, interruptions of communication connections between computer units of an industrial automation system can lead to an undesirable or unnecessary repetition of a communication of a service request. This causes an additional capacity utilization of communication connections of the industrial automation system, which can lead to further system disturbances or faults. A particular problem area in industrial automation systems regularly results from message traffic with comparatively many, but relatively short messages, as a result of which the above problems are intensified.

In order to be able to compensate for failures of communication connections or devices, communication protocols such as high-availability seamless redundancy or parallel redundancy protocol have been developed for high-availability, redundantly operable industrial communication networks. High-availability seamless redundancy (HSR) and parallel redundancy protocol (PRP) are defined in the International Electrotechnical Commission Standard (IEC) 62439-3 and enable hitless redundant transmission of data packets with extremely short recovery times. In accordance with high-availability seamless redundancy and parallel redundancy protocol, each data packet is duplicated by a transmitting communication device and sent to a receiver on two different paths. Redundant data packets representing duplicates are filtered out of a received data stream by a communication device at the receiver ends.

DE 10 2008 017 192 A1 describes a method for establishing a network comprising a first network subscriber having a set of ports. The ports are connected to ports of further network subscribers of the network. In a first method step, the ports assigned to the first network subscriber are switched into a first operating mode. In the first operating mode, test messages can be received and transmitted via the ports. In accordance with a further method step, test messages are transmitted via the ports assigned to the first network subscriber. Furthermore, the ports assigned to the first network subscriber are switched into a second operating mode if no test message of the transmitted test messages is received again by the first network subscriber. In the second operating mode, messages received via one of the ports assigned to the first network subscriber are forwarded via the remaining ports. In this way, it is possible to avoid formation of network loops when internetworking or extending complex networks.

EP 2 282 452 A1 describes a method for data communication within a ring-link communication network, where the data communication is effected in accordance with high-availability seamless redundancy and the communication network comprises at least one master node, a source node and a destination node. Each node has a first and a second communication interface with a respective first and second neighboring node. Furthermore, each node receives data frames via the first communication interface and forwards the received data frame either changed or unchanged via the second communication interface without additional delay. The master node transmits a first and second redundant data frame or an empty data packet to its first and second neighboring node, respectively. Upon reception of the two redundant data frames, the source node fills the respective data frame with process data in a predetermined reserved area. Afterward, each filled data frame is immediately and individually forwarded to the first and second neighboring node of the source node, respectively. The destination node further extracts the process data from the first received filled data frame of a pair of redundant data frames.

EP 2 343 857 A1 describes a network node for a communication network comprising a first sub-network and a second sub-network, which is connected to the first sub-network. While data transmission is effected in accordance with a spanning tree protocol in the first sub-network, a second protocol, which differs from the protocol used in the first sub-network is used for data transmission in the second sub-network. The network node described in EP 2 343 857 A1 is designed as an element for the second sub-network and for communication within the second sub-network. Furthermore, the network node is designed, by means of spanning tree functionality, as a spanning tree main node for monitoring and controlling the second sub-network. As a result, the second sub-network can be handled as a virtual network node by the spanning tree protocol used in the first sub-network.

EP 2 413 538 A1 discloses a method for redundant communication in a communication system comprising a plurality of communication networks. The communication networks are connected to one another via at least one coupling node. Data originating from a first communication network are prevented from being transmitted back from a second communication network into the first communication network based on information defined prior to data transmission.

SUMMARY OF THE INVENTION

It is an object of the present invention to provide a powerful and cost-effective communication device for a redundantly operable industrial communication network and a method for operating such a communication device.

This and other objects and advantages are achieved according to the invention by providing a communication device and a method for operating the communication device in a redundant industrial communication network, where the communication device according to the invention for the redundantly operable industrial communication network comprises at least one first and one second transmitting and receiving unit each having an interface for a network connection of the industrial communication network. In accordance with the invention, both transmitting and receiving units have an identical network address and an identical device identifier. The device identifier can be a media access control (MAC) address, for example. A signal processing unit is connected to the first and second transmitting and receiving units. The signal processing unit has a multiplexer unit for the parallel forwarding of data packets to be transmitted to both transmitting units and a redundancy handling unit for the processing of data packets received by both receiving units. The redundancy handling unit additionally comprises a filter unit configured to detect received redundant data packets. A singly linked network node is connected to the signal processing unit via a coupling element. The coupling element is preferably a high-speed bus, via which, for example, further singly linked network nodes can be connected to the signal processing unit. A data transmission within the industrial communication network can be effected, for example, in accordance with high-availability seamless redundancy and/or in accordance with parallel redundancy protocol.

Furthermore, according to the invention, the signal processing unit is connected to the coupling element via a first and second interface. In this case, the first interface is provided exclusively for communicating data packets received by the first receiving unit, while the second interface is provided exclusively for communicating data packets received by the second receiving unit. Furthermore, the redundancy handling unit comprises an identification unit configured to insert a redundancy indicator into a received redundant data packet. In this case, the redundancy handling unit is configured to forward, in a manner free of buffer storage, data packets received by both receiving units to the coupling element. In accordance with one preferred embodiment of the present invention, a data packet comprises at least one data frame, and the redundancy indicator is formed in a simple manner by an inserted invalid datum of a data frame.

The communication device according to the invention obviates hitherto customary complete buffering of received data packets by the signal processing or redundancy handling unit including management of buffer-stored data packets. This enables the signal processing unit to be realized simply and cost-effectively with low power consumption. In accordance with one particularly preferred embodiment of the present invention, the signal processing unit comprising the multiplexer unit and the redundancy handling unit is realized by a field programmable gate array. In this case, the coupling element is preferably a backplane switch with assigned controller. Furthermore, the backplane switch can be connected to the at least one singly linked network node via at least one interlink connection.

In addition, the field programmable gate array (FPGA) can be used for storing a table (proxy node table) with indications concerning all singly linked network nodes connected to the coupling element. This enables simple management of singly linked network nodes connected to the communication device. Therefore, the communication device can be used as a basis for realizing devices such as HSR/PRP proxy or HSR/PRP RedBox in a simple manner. In particular, with the present invention or its embodiments it is possible to transfer HSR/PRP functionalities into an assembly that is separated from the coupling element or backplane switch and that is formed by the signal processing unit or the FPGA. As a result, it is possible to efficiently realize front-end solutions that supplement a switch assembly if necessary, for example, as an HSR/PRP front-end device. In addition, HSR/PRP functionalities can also be integrated on a media module in a modular Ethernet switch for real-time data communication.

In accordance with one preferred embodiment of the communication device according to the invention, mutually redundant data packets are identified by a uniform sequence number. In addition, the signal processing unit is assigned a storage unit configured to store sequence numbers of data packets already received without errors. In this case, the redundancy handling unit is configured to check for an already stored sequence number upon a new data packet being received. Furthermore, the coupling element is preferably assigned a detection unit configured to evaluate redundancy indicators in received data packets and for discarding data packets having redundancy indicators. Consequently, only an identification of redundant data packets is effected by the redundancy handling unit, while discarding is implemented on the part of the coupling element.

Preferably, the coupling element is assigned a counter unit configured to register data packets received without errors and data packets received with errors. Furthermore, the counter unit is connected to an evaluation unit. The evaluation unit is configured, for example, to signal an error-free redundant network state in the case of a difference between data packets received without errors and data packets received with errors that is below a predefinable threshold value. In addition, the evaluation unit is configurable for signaling a network state with redundancy loss in the case of a rising number of data packets received without errors and at the same time a substantially stagnant number of data packets received with errors. In accordance with a further embodiment of the present invention, the evaluation unit can also be configured to signal a network failure in the case of a stagnant number of data packets received without errors and data packets received with errors. Overall, this enables a simple network state diagnosis by a communication device, such as HSR/PRP proxy or HSR/PRP Red Box.

In accordance with the method according to the invention for operating a communication device in a redundant industrial communication network, the communication device comprises at least one first and one second transmitting and receiving unit each having an interface for a network connection of the industrial communication network. In this case, both transmitting and receiving units have an identical network address and an identical device identifier. A signal processing unit is connected to the first and second transmitting and receiving units, where the signal processing unit forwards data packets to be transmitted in parallel to both transmitting units and detects redundant data packets received by the receiving units. A singly linked network node is connected to the signal processing unit via a coupling element. Within the industrial communication network data packets can be transmitted, for example, in accordance with high-availability seamless redundancy and/or in accordance with parallel redundancy protocol.

In accordance with the method according to the invention, the signal processing unit is connected to the coupling element via a first and second interface. In this case, data packets received by the first receiving unit are communicated via the first interface, while data packets received by the second receiving unit are communicated via the second interface. Furthermore, the signal processing unit inserts a redundancy indicator into a received redundant data packet and forwards data packets received by both receiving units to the coupling element in a manner free of buffer storage. In accordance with one preferred embodiment of the method according to the invention, a data packet comprises at least one data frame, and the redundancy indicator is formed in a simple manner by inserting an invalid datum into a data frame. The method according to the disclosed embodiment of the invention obviates hitherto customary complete buffering of received data packets by the signal processing unit. This also applies to management of buffer-stored data packets. Preferably, a detection unit assigned to the coupling element evaluates redundancy indicators in received data packets and discards data packets having redundancy indicators. Consequently, merely identification of redundant data packets is effected by the signal processing unit, while redundant data packets are discarded on the part of the coupling element.

In accordance with one preferred embodiment of the method according to the invention, mutually redundant data packets are identified by a uniform sequence number. Furthermore, sequence numbers of data packets already received without errors are preferably stored in a storage unit assigned to the signal processing unit. Upon a new data packet being received, the signal processing unit can thus check the sequence number thereof for correspondence to an already stored sequence number in a simple manner.

Advantageously, a counter unit assigned to the coupling element registers data packets received without errors and data packets received with errors. An evaluation unit can thus signal an error-free redundant network state in the case of a difference between data packets received without errors and data packets received with errors which is below a predefinable threshold value. Data packets received with errors are preferably determined via a cyclic redundancy check. In accordance with a further embodiment of the method according to the invention, the evaluation unit signals a network state with redundancy loss in the case of a rising number of data packets received without errors and at the same time a substantially stagnant number of data packets received with errors. In addition, the evaluation unit can signal a network failure, for example, in the case of a rising number of data packets received without errors and data packets received with errors. This enables overall a simple network state diagnosis by a communication device, such as HSR/PRP proxy or HSR/PRP RedBox.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in greater detail below on the basis of an exemplary embodiment with reference to the drawing, in which.

DETAILED DESCRIPTION OF THE PREFERRED EMBODIMENTS

Figure 1:
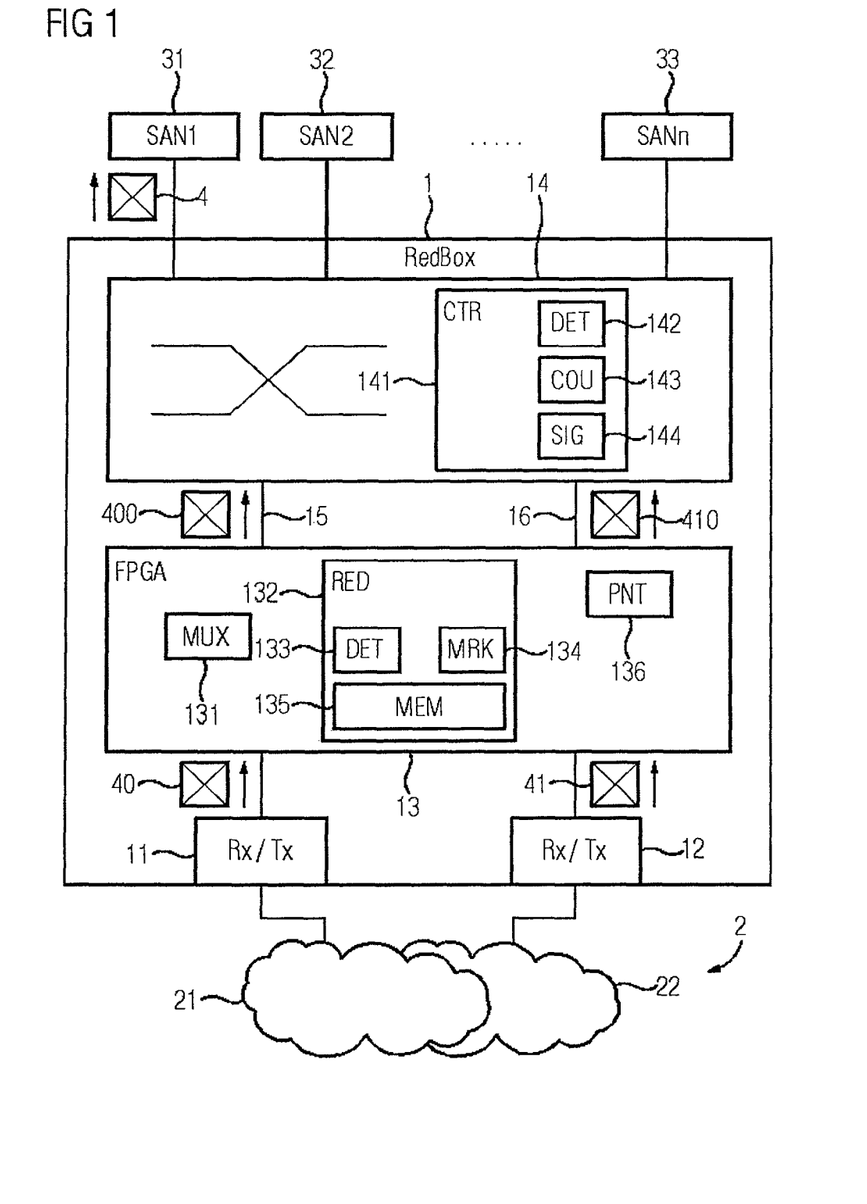
FIG. 1 shows a communication device for a redundantly operable industrial communication network in accordance with the invention.

The communication device 1 for a redundantly operable industrial communication network 2, as illustrated in FIG. 1, comprises a first 11, and a second transmitting and receiving unit 12 each having an interface for a network connection of the industrial communication network 2, which comprises two sub-networks 21 in the present exemplary embodiment. In addition or as an alternative thereto, the communication network 2 can comprise network nodes that are connected to one another in a ring structure and that are linked redundantly to the communication network 2 within the ring structure. Within the communication device illustrated in FIG. 1, data packets can be transmitted in accordance with high-availability seamless redundancy and/or in accordance with parallel redundancy protocol.

The two transmitting and receiving units 11, 12 have an identical network address and an identical MAC address. A signal processing unit 13 realized by a field programmable gate array (FPGA) is connected to the first and second transmitting and receiving units 11, 12, where the signal processing unit includes a multiplexer unit 131 for the parallel forwarding of data packets to be transmitted to both transmitting units 11, 12 and a redundancy handling unit 132 for the processing of data packets 40, 41 received by both receiving units 11, 12. The redundancy handling unit 132 comprises a filter unit 133 configured to detect received redundant data packets. A plurality of singly linked network nodes 31-33 are connected to the signal processing unit 13 via a coupling element 14 realized by a backplane switch. The coupling element 14, which has an assigned controller 141, is connected to a singly linked network node 31-33 via a respective interlink connection. Via the coupling element 14, a resulting data packet 4 after processing by the redundancy handling unit 132 is forwarded to a singly linked destination network node 31. In addition, the signal processing unit 13 has a storage unit 136, in which a table (proxy node table) is stored with indications concerning all singly linked network nodes 31-33 connected to the coupling element 14.

The signal processing unit 13 realized via a field programmable gate array is connected to the coupling element 14 via a first and second interface 15, 16. In this case, the first interface 15 is provided exclusively for communicating data packets 40 received by the first receiving unit 11, while the second interface 16 is provided exclusively for communicating data packets 41 received by the second receiving unit 12.

The redundancy handling unit 132 assigned to the signal processing unit 13 comprises an identification unit 134 configured to insert a redundancy indicator into a received redundant data packet 40, 41. In the present exemplary embodiment, a data packet comprises at least one data frame. The redundancy indicator is formed by inserting an invalid datum into a data frame. Furthermore, the signal processing unit 13 forwards data packets 40, 41 received by both receiving units 11, 12 to the coupling element 14 in a manner free of buffer storage. The data packets 40, 41 received by both receiving units 11, 12 differ from data packets 400, 410 forwarded to the coupling element 14 via the first and second interfaces 15, 16 merely in a duplicate, to be precise by an inserted invalid datum.

Figure 2:
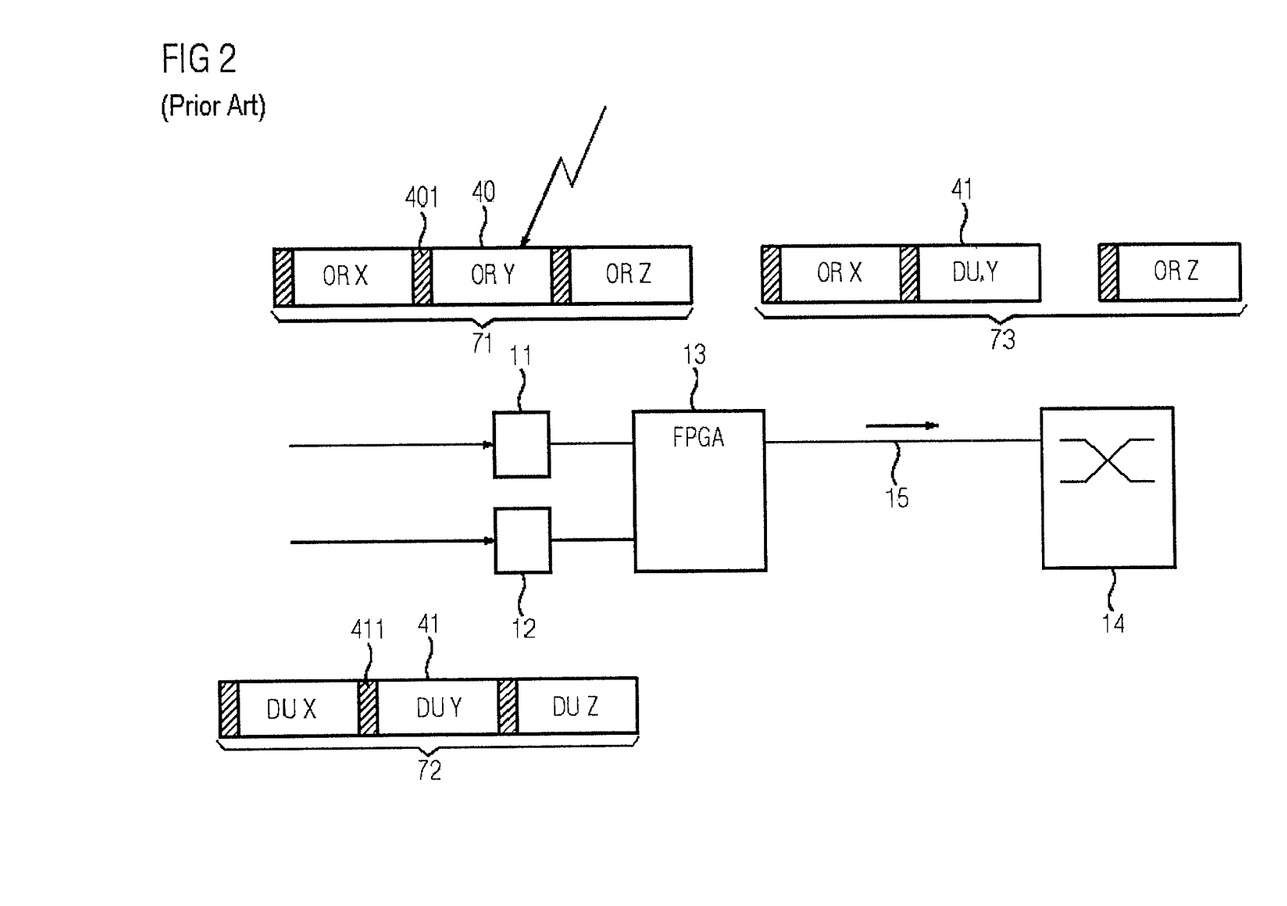
FIG. 2 shows a schematic illustration of a data packet stream processed by a conventional communication device.

In the case of the data packet stream processed by a conventional communication device, as illustrated schematically in FIG. 2, a redundant data packet is already discarded by the signal processing unit 13. In accordance with the conventional communication device illustrated in FIG. 2, the signal processing unit 13 is linked to the coupling element 14 only via one interface 15. At the first and second transmitting and receiving units 11, 12, a first 71 and second incoming data stream 72, respectively, are received, these data streams being mutually redundant and each comprising a plurality of successive data packets. In the present example, therefore, each data packet is present once as original and as duplicate. Mutually redundant data packets are in this case identified by a uniform sequence number.

If, within the first data stream 71, for example, a second data packet 40 as original is affected by a transmission error, a corresponding data packet 41 in the second data stream 72 as duplicate is determined in the signal processing unit 13 based on the sequence number 401 assigned to the data packet 40. In this case, the corresponding data packet 41 has a sequence number 411 identical to that of the data packet 40 affected by the transmission error. In an outgoing data stream 73 directed from the signal processing unit 13 to the coupling element 14, therefore, the data packet 40 affected by the transmission error as original is replaced by its corresponding data packet 41 as duplicate. Otherwise, originals of the respective data packets that are free of transmission errors are forwarded to the coupling element 14, while their duplicates are discarded by the signal processing unit 13. For such a procedure, data packets of the two incoming data streams 71, 72 have to be completely buffered in the signal processing unit 13 of a conventional communication device.

Figure 3:
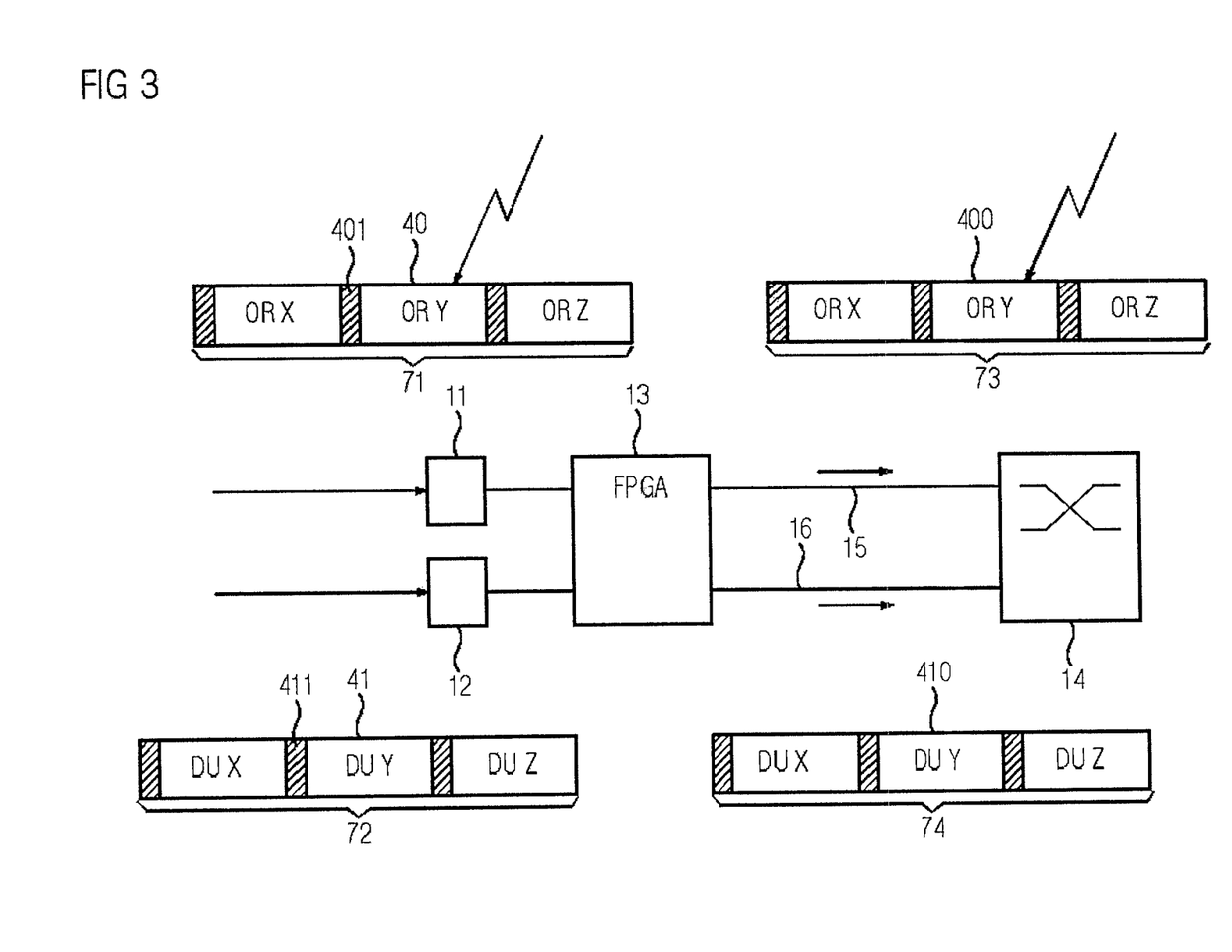
FIG. 3 shows a schematic illustration of a data packet stream processed by the communication device of FIG. 1.

In contrast thereto, in the case of the data packet stream which is illustrated schematically in FIG. 3 and which is processed by the communication device in accordance with FIG. 1, a redundant data packet is discarded only in the coupling element 14. In contrast to the conventional communication device illustrated in FIG. 2, the signal processing unit 13 in accordance with FIG. 3 is linked to the coupling element 14 via a first 15 and second interface 16. In accordance with FIG. 3, too, a first 71 and second incoming data stream 72 are received at the first and second transmitting and receiving unit 11, 12, respectively, these data streams being mutually redundant and each comprising a plurality of successive data packets. As before, mutually redundant data packets are identified by a uniform sequence number.

If, in the example illustrated in FIG. 3, a second data packet 40 within the first data stream 71 as original is affected by a transmission error, it is likewise the case that, based on the sequence number 401 assigned to that data packet 40, a corresponding data packet 41 in the second data stream 72 as duplicate having an identical sequence number 411 is determined in the signal processing unit 13.

In contrast to the example in accordance with FIG. 2, however, both incoming data streams 71, 72 are forwarded to the coupling element 14 substantially unchanged as outgoing data streams 73, 74. Only the second data packet 40—affected by a transmission error—of the first incoming data stream 71 experiences a change by the signal processing unit 14 in the form of an inserted invalid datum. By virtue of this inserted invalid datum, the second data packet 400 of the first outgoing data stream 73 differs from the second data packet 40 of the first incoming data stream 71. The second data packet 41 of the second incoming data stream 72 and the second data packet 410 of the second outgoing data stream 74 are identical, by contrast.

In accordance with the example illustrated in FIG. 3, the data packet 400 affected by the transmission error as original is replaced by its corresponding data packet 410 as duplicate only in the coupling element 14. Thus, such a procedure does not require complete buffering of data packets of the two incoming data streams 71, 72 in the signal processing unit 13.

By way of example, it suffices if only sequence numbers of data packets already received without errors are stored in a storage unit 135 assigned to the signal processing unit 13 in accordance with FIG. 1. For identifying received redundant data packets, the signal processing unit 13, upon a new data packet being received, checks the sequence number thereof simply for correspondence to an already stored sequence number. Redundancy indicators in received data packets, such as an invalid datum, are preferably evaluated by a detection unit 142 illustrated in FIG. 1, where the detection unit is assigned to the controller 141 of the coupling element 14 and discards data packets having redundancy indicators. This can be done for example based on a cyclic redundancy check.

In accordance with FIG. 1, the controller 141 of the coupling element 14 is additionally assigned a counter unit 143, which registers data packets received without errors and data packets received with errors. An evaluation unit 144 assigned to the controller 141 of the coupling element 14 signals an error-free redundant network state in the case of a difference between data packets received without errors and data packets received with errors that is below a predefinable threshold value. Data packets received with errors are preferably determined via a cyclic redundancy check.

The evaluation unit 144 signals a network state with redundancy loss in the case of a rising number of data packets received without errors and at the same time a substantially stagnant number of data packets received with errors. The evaluation unit 144 signals a network failure in the case of a stagnant number of data packets received without errors and data packets received with errors.

Figure 4:
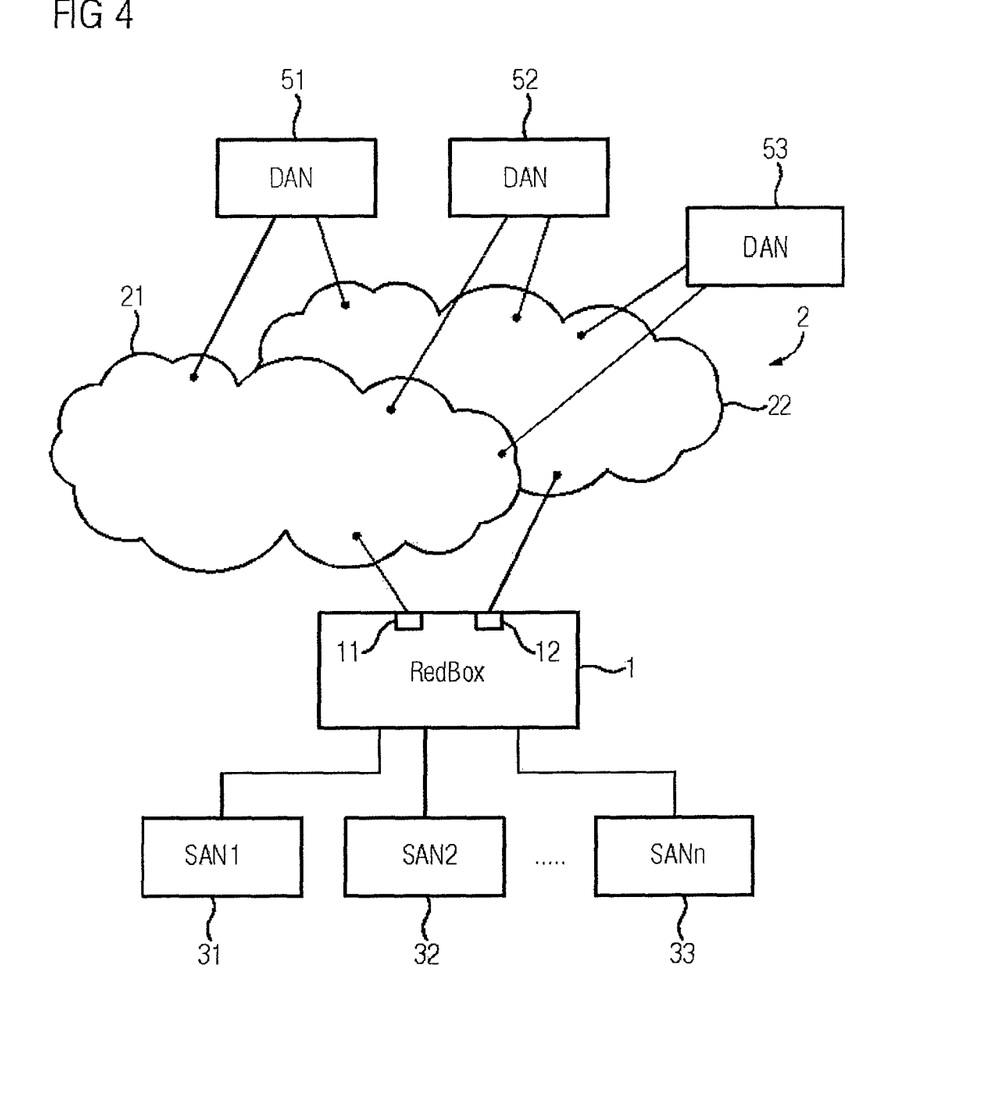
FIG. 4 shows the communication device of FIG. 1 in a communication network with data transmission in accordance with parallel redundancy protocol (PRP)
Figure 5:
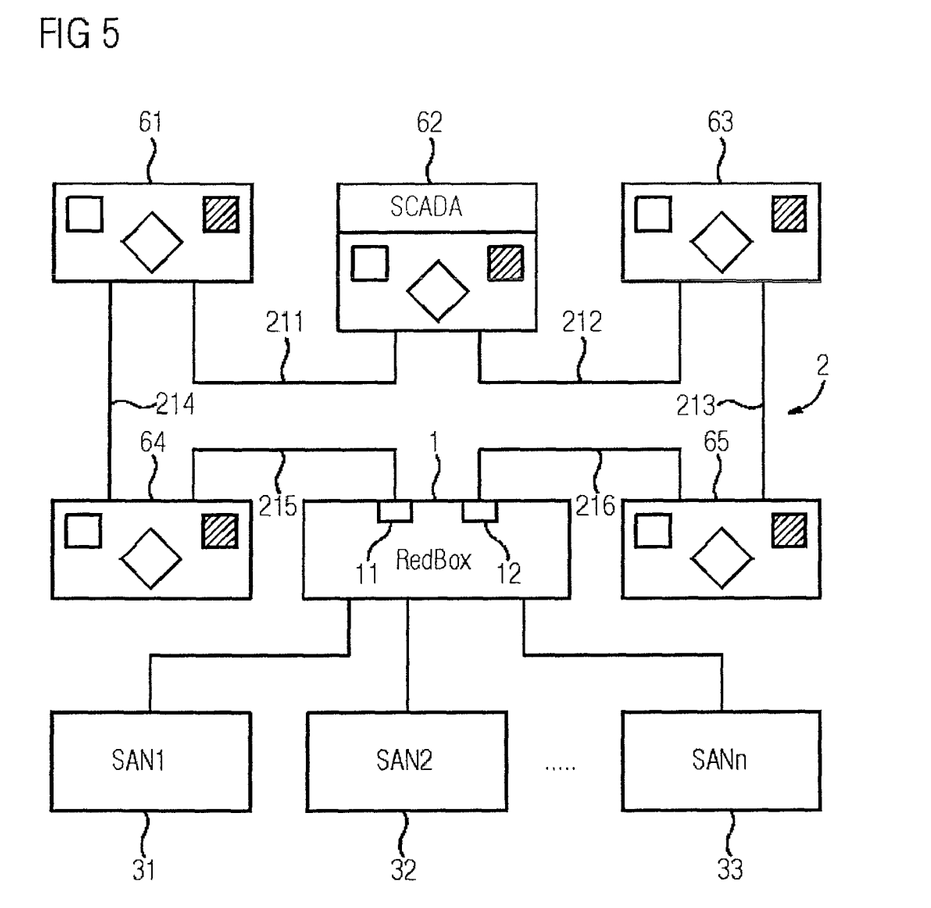
FIG. 5 shows the communication device in accordance with FIG. 1 in a communication network with data transmission in accordance with high-availability seamless redundancy (HSR)

Based on the communication device 1 illustrated in FIG. 1, it is possible, in accordance with FIGS. 4 and 5, to realize a RedBox for PRP or HSR communication networks 2 in which data packets are transmitted in accordance with high-availability seamless redundancy or in accordance with parallel redundancy protocol. In accordance with FIG. 4, the RedBox 1 is linked by its transmitting and receiving units 11, 12 respectively to a sub-network 21, 22 of a PRP communication network 2 comprising a plurality of doubly linked PRP network nodes 51-53. In addition, the RedBox 1 is connected to a plurality of singly linked network nodes 31, 33.

The HSR communication network 2 illustrated in FIG. 5 comprises a plurality of HSR network nodes 61-65 connected to one another in a ring structure via network connections 211-216. These can include an HSR network node 62, for example, which is assigned to a SCADA system (supervisory control and data acquisition) of an industrial manufacturing or process automation system. Furthermore, in accordance with FIG. 5, a RedBox 1 based on the communication device 1 illustrated in FIG. 1 can also be incorporated into the ring structure of the HSR communication network 2. In this case, the RedBox 1 is linked by its transmitting and receiving units 11, 12 respectively to a network connection 215, 216 of the HSR communication network 2. Analogously to FIG. 4, the RedBox 1 is additionally connected to a plurality of singly linked network nodes 31-33.

Figure 6:
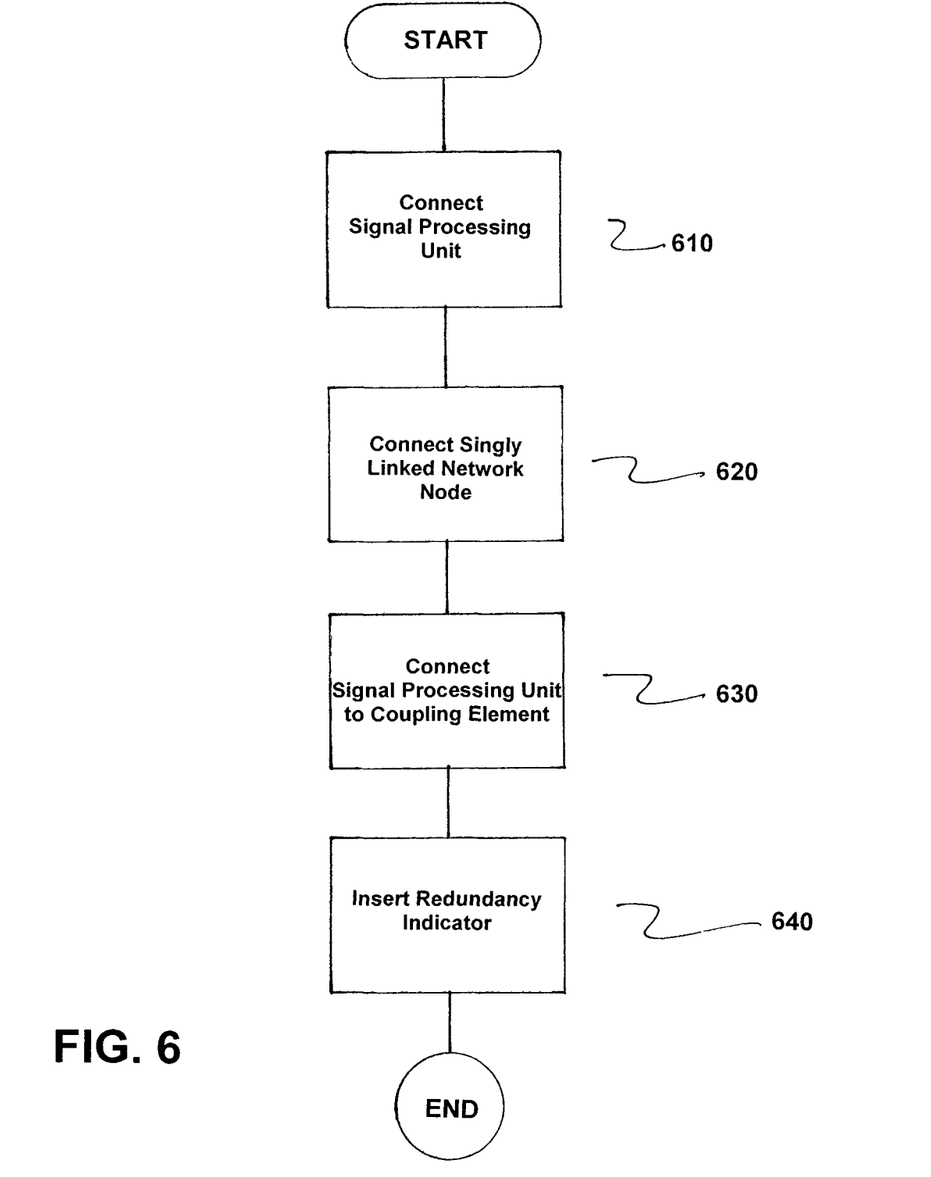
FIG. 6 is a flowchart of the method in accordance with the invention.

FIG. 6 is a flowchart of a method for operating a communication device in a redundant industrial communication network, where the communication device comprises at least one first and one second transmitting and receiving unit each including an interface for a network connection of the industrial communication network, and where both transmitting and receiving units include an identical network address and an identical device identifier. The method comprising connecting a signal processing unit to the at least one first and second transmitting and receiving units, as indicated in step 610. Here, the signal processing unit forwards data packets to be transmitted in parallel to the at least one first and second transmitting units and detects redundant data packets received by the at least one first and second receiving units.

Next, a singly linked network node is connected to the signal processing unit via a coupling element, as indicated in step 620. Next, the signal processing unit is connected to the coupling element via a first and second interface, as indicated in step 630. Here, data packets received by the first receiving unit are communicated via the first interface, and data packets received by the second receiving unit are communicated via the second interface.

The signal processing unit then inserts a redundancy indicator into a received redundant data packet and forwards data packets received by the at least one first and second receiving units to the coupling element in a manner free of buffer storage, as indicated in step 640.

The features of the exemplary embodiments described above can be realized both individually and in a described combination with one another.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A communication device for a redundantly operable industrial communication network, comprising:
    at least one first and one second transmitter and receiver each having an interface for a network connection of the redundantly operable industrial communication network, the at least one first and second transmitter and receivers having an identical network address and an identical device identifier;
    a signal processor connected to the first and second transmitter and receivers and having a multiplexer for parallel forwarding of data packets to be transmitted to the at least one first and second transmitters and a redundancy handler for the processing of data packets received by the at least one first and one second receivers, the redundancy handler comprising a filter configured to detect received redundant data packets; and
    a singly linked network node connected to the signal processor via a coupling element;
    wherein the signal processor is connected to the coupling element via a first and second interface, the first interface exclusively communicating data packets received by the first receiver to the coupling element, and the second interface exclusively communicating data packets received by the second receiver to the coupling element; and
    wherein the redundancy handler comprises an identifier configured to insert a redundancy indicator into a received redundant data packet, the redundancy handler being configured to forward, in a manner free of buffer storage, data packets received by the at least one first and second receivers to the coupling element.

2. The communication device as claimed in claim 1, wherein mutually redundant data packets are identified by a uniform sequence number, and wherein the signal processing unit is assigned storage configured to store sequence numbers of data packets already received without errors; and
    wherein the redundancy handler is configured to check for an already stored sequence number upon receipt of a new data packet.

3. The communication device as claimed in claim 2, wherein the coupling element is assigned a detector configured to evaluate redundancy indicators in received data packets and to discard data packets having redundancy indicators.

4. The communication device as claimed in claim 1, wherein the coupling element is assigned a detector configured to evaluate redundancy indicators in received data packets and to discard data packets having redundancy indicators.

5. The communication device as claimed in claim 1, wherein the coupling element is assigned a counter configured to register data packets received without errors and data packets received with errors; and
    wherein the counter is connected to an evaluator configured to signal an error-free redundant network state in a case of a difference between data packets received without errors and data packets received with errors which is below a pre-definable threshold value.

6. The communication device as claimed in claim 5, wherein the evaluator is configured to signal a network state with redundancy loss in a case of a rising number of data packets received without errors and at a same time a substantially stagnant number of data packets received with errors.

7. The communication device as claimed in claim 6, wherein the evaluator is further configured to signal a network failure in a case of a stagnant number of data packets received without errors and data packets received with errors.

8. The communication device as claimed in claim 5, wherein the evaluator is further configured to signal a network failure in a case of a stagnant number of data packets received without errors and data packets received with errors.

9. The communication device as claimed in claim 1, wherein a data packet comprises at least one data frame, and wherein the redundancy indicator is formed by an inserted invalid datum of a data frame.

10. The communication device as claimed in claim 1, wherein the coupling element comprises a high-speed bus, and wherein further singly linked network nodes are connected to the signal processor via the high-speed bus.

11. The communication device as claimed in claim 1, wherein the signal processor is realized via a field programmable gate array; and wherein the coupling element comprises a backplane switch including an assigned controller; and
    wherein the backplane switch is connected to the at least one singly linked network node via at least one interlink connection.

12. The communication device as claimed in claim 1, wherein a data transmission is effected in accordance with at least one of high-availability seamless redundancy and parallel redundancy protocol.

13. A method for operating a communication device in a redundant industrial communication network, wherein the communication device comprises at least one first and one second transmitter and receiver each including an interface for a network connection of the industrial communication network, and wherein both the transmitter and receiver include an identical network address and an identical device identifier, the method comprising the steps of:
    connecting a signal processor to the at least one first and second transmitter and receiver; forwarding, by a multiplexer of the signal processor, data packets to be transmitted in parallel to the at least one first and second transmitters and detecting, by a redundancy handler of the signal processor, redundant data packets received by the at least one first and second receivers;

connecting a singly linked network node to the signal processor via a coupling element;

connecting the signal processor to the coupling element via a first and second interface, data packets received by the first receiver being communicated exclusively via the first interface to the coupling element, and data packets received by the second receiver being communicated exclusively via the second interface to the coupling element; and inserting, by the redundancy handler, a redundancy indicator into a received redundant data packet and forwarding data packets received by the at least one first and second receivers to the coupling element in a manner free of buffer storage.

14. The method as claimed in claim 13, further comprising the steps of:
identifying mutually redundant data packets by a uniform sequence number;
storing sequence numbers of data packets already received without errors in a storage unit assigned to the signal processor; and
checking, by the redundancy handler, upon receipt of a new data packet, the sequence number thereof for correspondence to a sequence number already stored.

15. The method as claimed in either of claim 13, further comprising the steps of:
evaluating, by a detector assigned to the coupling element, redundancy indicators in received data packets and discarding data packets having redundancy indicators.

16. The method as claimed in any of claim 13, further comprising the steps of:
registering, by a counter assigned to the coupling element, data packets received without errors and data packets received with errors; and signaling, by an evaluator, an error-free redundant network state in a case of a difference between data packets received without errors and data packets received with errors which is below a predefinable threshold value; and performing a cyclic redundancy check to determine the data packets received with errors.

17. The method as claimed in claim 16, wherein the evaluator signals a network state with redundancy loss in a case of a rising number of data packets received without errors and at a same time a substantially stagnant number of data packets received with errors.

18. The method as claimed in either of claim 17, wherein the evaluator signals a network failure in a case of a stagnant number of data packets received without errors and data packets received with errors.

19. The method as claimed in either of claim 16, wherein the evaluator signals a network failure in a case of a stagnant number of data packets received without errors and data packets received with errors.

20. The method as claimed in claim 13, wherein a data packet comprises at least one data frame, and wherein the redundancy indicator is formed by inserting an invalid datum into a data frame.

21. The method as claimed in claim 13, wherein the data packets are transmitted in accordance with at least one of high-availability seamless redundancy and parallel redundancy protocol.

* * * * *